Patented May 19, 1953

2,639,241

UNITED STATES PATENT OFFICE 2,639,241

NONFOGGY MOISTUREPROOF SHEET

Ralph T. K. Cornwell, Rosemont, Pa., assignor to American Viscose Corporation, Wilmington, Del., a corporation of Delaware No Drawing. Application July 14, 1948, Serial No. 38,741

3 Claims. (Cl. 117—68)

This invention relates to clear hydrophilic films, sheets or pellicles provided with a moistureproofing coating having non-fogging characteristics.

Clear films of hydrophilic character, such as cellophane, frequently are coated with a moistureproofing composition for the purpose of producing protective wrapping or packaging materials. However, when such materials are used with packages the contents of which contain large amounts of moisture, considerable trouble is encountered in connection with the tendency of moisture within the package to condense as droplets on the inside surface of the wrapper. This condensate gives rise to an unsightly package and in some cases practically obscures the contents, which is precisely the opposite of the intended effect of such transparent wrapping materials.

It is the object of the present invention to provide a moistureproof hydrophilic film which remains clear and free of fogging tendencies even under the most adverse atmospheric conditions. Other objects and advantages will be apparent from the description hereinafter.

In general, the present invention comprises providing upon a clear transparent hydrophilic pellicle a thermoplastic resin moistureproofing layer which also contains a wetting agent in relatively small proportions. The incorporation of from ½ to 5% of a wetting agent based on the weight of the resin in the moistureproofing coating has been found to prevent fogging and at the same time does not detract from the moistureproof quality of the resin coating.

The resin permanently retains the wetting agent throughout its mass even in its surface, so that the wetting agent cannot easily be removed by washing in anything short of a solvent for the resin itself. At the surface of the resin coating, the hydrophobic group of the wetting agent is virtually dissolved within the body of the resin, whereas the hydrophilic groups tend to be repelled out of the body of the resin coating during its formation so that numerous of the water-absorbing groups of the wetting agent are exposed for spreading the moisture droplets on the surface of the coated material to clear the films while the remaining groups thereof are firmly bound within the body of the resin. The formation of droplets of water is thus prevented.

Any inherently moistureproof thermoplastic resin which is soluble in suitable solvents is contemplated within the present invention. Preferably, the resins employed have sufficiently low softening and melting points as to allow of heat-sealing in a commercially feasible manner, such as in automatic packaging machines. Examples of such resins are: polymers of vinylidene chloride, such as the homopolymers thereof and copolymers thereof with vinyl chloride and/or acrylonitrile, such as those copolymers containing from 20 to 80% of the vinylidene chloride component, also cyclized rubbers such as are commercially available under the trade name "Pliolite." Preferably, the resins are of sufficiently low melting point as to allow of heat-sealing at temperatures between 70 and 130° C. This range of temperature refers to the temperature at which the resins become sufficiently tacky to fuse together and not specifically to what may be termed softening points or melting points.

The term "moistureproof" as used throughout this specification and the claims is to be construed as defining a material, which in the form of a continuous, unbroken sheet or film, will permit the passage of not more than 7 grams of water vapor per square meter per hour over a period of 24 hours, at approximately 39.5° C., plus or minus 0.5° C., the relative humidity of the atmosphere at one side of the film being maintained at least at 98%, and the relative humidity of the atmosphere at the other side of the film being maintained at such value as to give a humidity differential of at least 95%.

By the term "waterproof" is meant the ability of the coating material to remain adhered to the base sheet during immersion in water for an unlimited period of time.

Any suitably compatible wetting agent may be employed such as the surface-active esters of organic sulfopolycarboxylic acids such as the dibutyl, diamyl and dihexyl esters of sulfophthalic acid, the diamyl, dihexyl, dioctyl, di(2-ethylhexyl), and didecyl esters of sulfosuccinic acid, and the tributyl, triamyl and trihexyl esters of sulfotricarbalyllic acid. The sulfates of the higher fatty alcohols having from 8 to 20 carbon atoms are also useful. Other oil-soluble wetting agents that may be used are sodium or ammonium alkyl aryl sulfonates (sold commercially as "Nacconol"), alkylated aryl sulfonates (sold as "Santomerse"), alkyl phenylene sodium sulfonates (sold as "Invadine B"), the compound $C_{17}H_{33}CONCH_3C_2H_4SO_3Na$, which is the stearyl amide of methyl taurine (sold as "Igepon T"), and the sodium sulfonate of oleic acid ester of aliphatic compound (sold as "Igepon AP"). It should be mentioned, however, that many of these wetting agents in their commercially available forms contain inorganic salts such as sodium sulfate which may or may not be removed before they are used for the purposes of the present invention.

The hydrophilic pellicle

The base sheet of the article of the present invention is formed of a pellicle having any desired shape, such as a sheet, bag, band, tube, cap, cup, or other body. The pellicle is formed of a hydrophilic colloid, such as gelatine, casein, cellulose hydrate or regenerated cellulose, which may be formed by the regeneration of viscose, the precipitation of cellulose hydrate from cuprammonium solutions of cellulose, or solutions of cellulose in other inorganic solvents as a class, such as zinc chloride; organic solvent solutions of cellulose as a class, such as solutions of cellulose in quaternary ammonium bases; or by the de-esterification of cellulose esters; and alkali-soluble, water-insoluble cellulose ethers as a class, such as alkyl cellulose ethers, hydroxy alkyl cellulose ethers and carboxy alkyl cellulose ethers, also gelatine (hardened and/or partially hydrolyzed), deacetylated chitin, casein, and the like.

Depending upon the use of the moistureproof sheet, i. e., in particular upon the severity of exposure conditions, the moistureproofing coating may be applied directly to the sheet or it may be provided with one or more intermediate coatings for assisting its adherence under the various conditions of exposure. Such intermediate coatings are generally termed "sub-coating" or "anchor coatings." Any water-resisting anchor coating may be employed which is capable of adhering or being adhered to both the hydrophilic pellicle and the moistureproofing resin coating. Illustrative examples of anchor coatings are urea-formaldehyde resin coatings such as are described in Jebens Patent 2,280,829, and melamine-formaldehyde coatings described in Pollard Patents 2,394,009 and 2,417,014.

In the following examples which are illustrative of the invention, the parts given are by weight:

EXAMPLE I

A cellophane film is coated on all sides with a lacquer comprising 98 parts of saran (a copolymer of vinylidene chloride and vinyl chloride) of high viscosity and 2½ parts of di-2-ethylhexyl sulfosuccinate dissolved in methylethyl ketone.

EXAMPLE II

A sheet of cellophane is provided on all sides with a subcoating formed from a composition prepared by mixing together:

| | Parts |
|---|---|
| Film-forming agent: | |
|    Urea-formaldehyde butanol ether resin | 39 |
| Plasticizer: | |
|    Alkyd resin | 20 |
| Hardening agent: | |
|    Maleic acid | 10 |
| Moistureproofing agent: | |
|    Paraffin wax (M. P. 60° C.) | 1 |
| Wax blending agent: | |
|    A mixture of esterified ester gum | 15 |
|    and rapeseed oil | .5 |

This composition is dissolved in a mixture of toluene, xylene, butyl alcohol and butyl acetate to give a solution containing from 5–20% of solids, and after application to the pellicle, the solvent is evaporated at an elevated temperature, for example, from 75° to 98° C. During the evaporation of the solvent, the heat causes a further polymerization or hardening of the thermosetting resin to the insoluble stage and causes the coating to become firmly anchored to the pellicle so that it will not blister when immersed in water for a long period.

Thereafter the sheet is coated on all sides with a composition comprising a copolymer of vinylidene chloride and vinyl chloride in which 80 parts of vinylidene chloride are copolymerized with 20 parts of vinyl chloride made up to form a 15% solution in a solvent comprising a mixture of 80 parts toluene and 20 parts of dioxane and containing 5% of lauryl alcohol sulfate by weight of the copolymer.

EXAMPLE III

A cellophane sheet was treated on all sides with a preliminary water-soluble condensate of melamine formaldehyde as in the Pollard patents cited above and after drying, the sheet was coated on all sides with a solution of a "Pliolite" (50 parts) and isopropyl phenyl sulfonate (1 part) dissolved in toluene.

The coated pellicle of the invention is non-fogging and heat-seals rapidly to produce strong water-resisting seals at moderate temperatures. The top coating is substantially insoluble in water, gasoline, naphtha, fats and greases and other materials which might come into contact with the wrapper. It has been found that the vinylidene chloride polymers, in particular, the coatings of the copolymer of vinylidene chloride and vinyl chloride, are extremely moistureproof and are among the least water-absorbing of all plastic materials.

Since certain changes in carrying out the above process, and certain modifications in the article which embody the invention may be made without departing from its scope, it is intended that all matter contained in the above description shall be interpreted as illustrative, and not in a limiting sense.

I claim:

1. As an article of manufacture, a non-fogging sheet material comprising a non-fibrous, clear, transparent pellicle of regenerated cellulose having on both faces thereof a water-resisting coating comprising a resin from the group consisting of urea-formaldehyde and melamine-formaldehyde resins and an outer inherently moistureproof coating on both faces containing a synthetic thermoplastic resin selected from the group consisting of cyclized rubbers and copolymers of 20 to 80% vinylidene chloride with a member from the group consisting of vinyl chloride and acrylonitrile, said outer coating containing, on the weight of the resin, ½ to 5% of a compatible wetting agent selected from the group consisting of the surface-active dialkyl esters of sulfophthalic acid and of sulfosuccinic acid, the surface-active trialkyl esters of sulfotricarballyic acid, the sulfates of higher fatty alcohols having from 8 to 20 carbon atoms, surface-active sodium and ammonium salts of alkyl aryl sulfonates, surface-active alkylated aryl sulfonates, alkyl phenylene sodium sulfonates, the stearyl amide of methyl taurine, and the sodium sulfonate of oleic acid esters of aliphatic alcohols, said outer coating having the characteristic of heat-sealing at temperatures between 70 and 130° C.

2. As an article of manufacture, a non-fogging sheet material comprising a non-fibrous, clear, transparent sheet of regenerated cellulose having on both faces thereof a water-resisting coating comprising a resin from the group consisting of urea-formaldehyde and melamine-formaldehyde resins and an outer inherently moistureproof coating on both faces containing a copolymer of 20 to 80% vinylidene chloride with a member selected from the group consisting of vinyl chloride and acrylonitrile and, on the weight of the copolymer, ½ to 5% of a compatible wetting agent selected from the group consisting of sulfates of the higher fatty alcohols having from 8 to 20 carbon atoms, said coating having the characteristic of heat-sealing at temperatures between 70 and 130° C.

3. As an article of manufacture, a non-fogging sheet material comprising a non-fibrous, clear, transparent sheet of regenerated cellulose having on both faces thereof a water-resisting coating comprising a resin from the group consisting of urea-formaldehyde and melamine-formaldehyde resins and an outer inherently moistureproof coating on both faces containing a copolymer of 80% vinylidene chloride with 20% vinyl chloride and, on the weight of the copolymer, about 2½% by weight of lauryl alcohol sulfate, said coating having the characteristic of heat-sealing at temperatures between 70 and 130° C.

RALPH T. K. CORNWELL.

References Cited in the file of this patent

UNITED STATES PATENTS

| Number | Name | Date |
|---|---|---|
| 2,095,129 | Drew | Oct. 5, 1937 |
| 2,169,366 | Meigs | Aug. 15, 1939 |
| 2,173,129 | Oglesby | Sept. 19, 1939 |
| 2,334,236 | Arnold | Nov. 16, 1943 |
| 2,372,171 | Bennett | Mar. 27, 1945 |
| 2,385,110 | Seymour et al. | Sept. 18, 1945 |
| 2,393,863 | Myers | Jan. 29, 1946 |
| 2,454,886 | Sapiro | Nov. 30, 1948 |
| 2,462,185 | Hauser | Feb. 22, 1949 |
| 2,463,282 | Kang | Mar. 1, 1949 |
| 2,389,026 | Gilbert | Nov. 22, 1949 |